Figure 1:
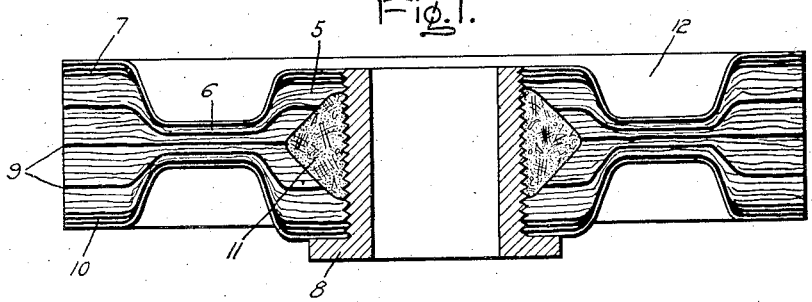

Oct. 5, 1926.

E. J. GUAY 1,601,913

NONMETALLIC GEAR

Filed Oct. 31, 1925

Inventor:
Emile J. Guay,
by *Alexander S. [signature]*
His Attorney.

Patented Oct. 5, 1926.

1,601,913

UNITED STATES PATENT OFFICE.

EMILE J. GUAY, OF SWAMPSCOTT, MASSACHUSETTS, ASSIGNOR TO GENERAL ELECTRIC COMPANY, A CORPORATION OF NEW YORK.

NONMETALLIC GEAR.

Application filed October 31, 1925. Serial No. 66,094.

The present invention relates to gears which are composed of spinnable textile fibers and a binder, the latter holding the fibers in a highly compressed state, and has for its object to improve their construction and particularly of the rim or toothed portion thereof.

Gears of this character have a wide application in the industrial arts and as a specific example have very great utility in timing gear trains for automotive engines. Gears used in such trains are commonly subjected to great periodic shocks, greater than gears used for any other purpose of which I have knowledge and unless they are especially well made these shocks which are due chiefly to whipping of the crank shaft cause breakage of the teeth. As commonly constructed these gears are made of binder-treated tightly woven fabric in which the threads cross at right angles, have spiral teeth and relatively thin webs so that the rim will deflect or yield in an axial direction when the teeth are subjected to heavy or unusual shocks. In some cases this deflection may amount to as much as three thirty-seconds of an inch at the pitch line. Shocks of the order mentioned are of course injurious to the teeth and hence the importance of making the teeth very strong so as to minimize the effects of such shocks is of paramount importance.

In my Patent No. 1,501,026, dated July 8, 1924, I have disclosed a type of non-metallic gear comprising interspersed disks and washers or rings, all made of fabric woven from textile fibers and in which the fibers are tightly woven and are held under compression by a suitable binder. The present invention is an improvement over the type of gear described and claimed in said patent and is directed chiefly to the formation of the rim structure including the teeth and to the means for uniting the rim structure with the web.

I have discovered that the teeth and rim of a gear of the type disclosed in the patent can be made very much stronger and much less liable to injury under shocks if the rim and teeth instead of being made of woven material in which the threads cross each other at right angles, are made of twisted cords, such for example as are used in the manufacture of cord tires for automobiles, and where the cords instead of crossing each other at right angles are definitely positioned so as to cross one another in the teeth and rim at acute angles such as 10 to 15 degrees for example. In addition to being twisted, which assists in preventing the binder from too great penetration, the cords which I use are considerably larger in diameter than the threads which are commonly used in the manufacture of canvas or duck which has heretofore been employed in the manufacture of this type of gear.

For the web and hub portions of the gear tightly woven fabric such as canvas or duck is utilized since I have found this material to be strong and sufficiently elastic to permit of axial displacement when the teeth are subjected to abnormal shocks for long periods of time, without injury. I attribute the increased strength of the teeth and rim to the fact that the cords are definitely positioned with respect to the teeth and to each other and in such manner as to avoid short cross members in the teeth such as are present when ordinary woven fabrics are used and which being unanchored at both ends instead of adding strength are a source of weakness; to the fact that a better anchorage is obtained for the cords as they extend into the body of the rim and are held thereby; to the fact that the cords are free to adjust themselves when subject to heavy pressure when in the mold, thereby avoiding regions of unequal compression, and to the fact that the cord, being twisted, the binder cannot freely penetrate the same and thereby render them hard and brittle. For some gears, especially those intended for heavy duty, the best results will be obtained by using cord that is hard-twisted in its manufacture. Whether the cord be hard-twisted or not I find it preferable for general purposes, to use cord made of three groups of twisted yarn which groups in turn are twisted to form the cord.

As an illustration of the greater capability to withstand shocks, possessed by gears of my invention, having cord-formed rims and teeth, over gears of the same size made wholly of tightly woven fabric, I have found by testing the same in a machine which delivers a succession of blows of a predetermined and constant value against a tooth, that on the average the gear having cord-formed teeth and rim, withstood 203,000 blows without breaking, whereas in the case of a high-grade gear intended for the same purpose and having teeth made of tightly woven fabric, the teeth broke at 7200 blows. In other words, the gear having the cord-formed rim and teeth is due to its resiliency capable of withstanding over twenty-eight times the shocks of a gear having a rim and teeth made of tightly woven fabric. This method of testing above outlined is one which I have found comparable to that of testing under actual load conditions and is, of course, much quicker. Moreover, the gear as a whole is much stronger than a woven fabric gear and has a greater life in service. The static breaking strength of my improved gear over the beforementioned woven fabric gear is of the order of two to one.

Another advantage which is of commercial importance is that the use of cord decreases the cost of the gear blanks.

Figure 2:
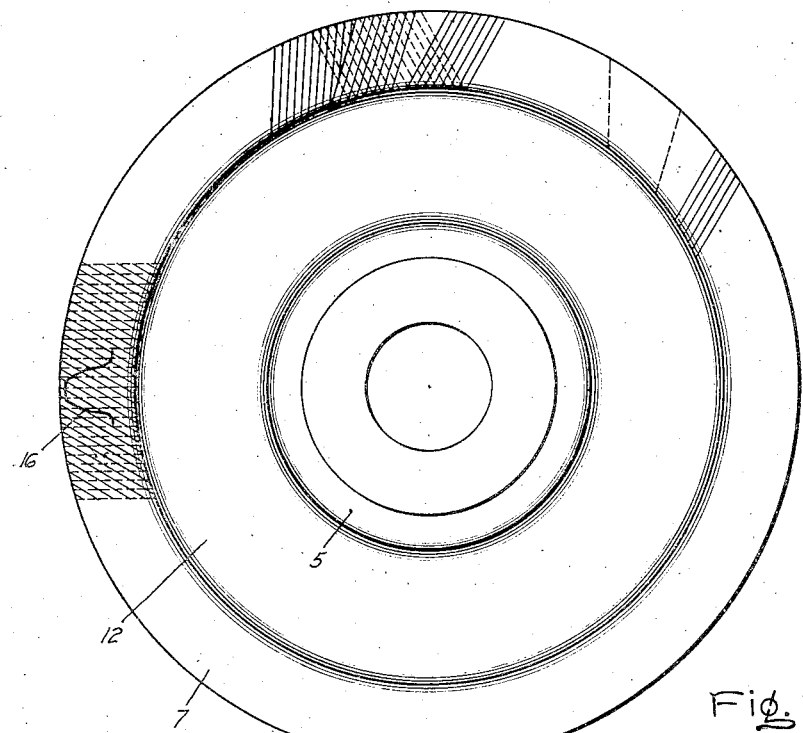
Figure 3:
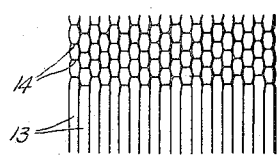
Figure 4:
Figure 5:
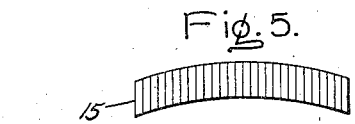

In the accompanying drawing which is illustrative of my invention, Fig. 1 is an axial section of a gear; Fig. 2 is a detail view showing the arrangement of the cord in the rim and teeth; Fig. 3 is a detail view showing a multiple arrangement of cords with a suitable carrier therefor; Fig. 4 shows a segment having its inner and outer edges cut with the same radius of curvature, and Fig. 5 shows a similar segment having its inner and outer edges cut with different radii of curvature.

5 indicates the hub of a gear, 6 the web and 7 the rim. The hub may be provided with a metal center 8 or not, depending upon the use to be made of the gear. The gear comprises a number of disks 9 made of tightly woven material such as canvas or duck of suitable weight, and a number of relatively thick washers or rings 10 composed of twisted cord arranged in layers. The disks and rings are interspersed. The fibers of the material are retained in a compressed state by means of a suitable binder, of which bakelite is an example. In order to form the thickened hub without cutting up expensive material for the purpose, I employ the scraps or trimmings which are left after forming the disks and rings and press them in a mold to form a washer 11 which surrounds the metal hub and is covered by the disks.

By making the web of woven fabric disks and relatively thin, I obtain the full advantages of a flexible web or one which will deflect axially when the teeth are subjected to abnormal or heavy shocks. I preferably limit the disks which are used to that number which will give the necessary strength without undue flexibility. The best results are obtained when all of the disks extend from the periphery of the gear to the hub. For the rim my experience is that four relatively thick rings 10 are the best for a gear having the proportions shown but a greater or lesser number may be employed, depending upon the service for which the gear is intended. The purpose in making the disks of the diameter stated is to afford a good anchorage for the rings which are interspersed therewith. As an illustration, but not as a limitation of my invention nine disks may be used of which six form the side faces, three on each side, the remaining three being situated between the rings.

By using a greater number of disks on the side faces than between the rings the blanks can be machined where necessary to true the faces without exposing the cords which form the rings. The outer disks each have a deep inset 12 and are carefully rounded where they merge into the rim and hub to avoid cracking of the fabric. It is preferable to pre-form these outer disks before being assembled in the fixture or mold used in completing the gear blank, and this is best done under heat and pressure, the heat being sufficient only to cause the binder to soften but not to become hard and brittle. The interspersed arrangement of the disks and rings does not differ greatly from that shown in my aforesaid patent with the exception that a lesser number of disks is used and the rings are substantially thicker and are of course made of different material and assembled in a different way.

To increase the strength of the teeth above that possible with ordinary woven fabric, the rim, which of course included the teeth, is made wholly of twisted binder-treated cord 13 except for the anchoring disks which are comparatively few in number and occupy only a comparatively small space. The arrangement of the cords is important where the greatest strength and anchorage is required. The cords which are first coated with a binder may be assembled individually to form the rings but as this would entail much labor without a special machine for the purpose, it is preferable to use such material as cord tire manufacturers use and in which the cords are formed in sheets with a few and rather widely spaced weak threads which serve as a carrier only and which are easily broken or stretched when subjected to pressure. The cord material is illustrated in Fig. 3 in which 13 indicates the large cords and 14 the light, small carrier threads, which after being coated with binder in accordance with any suitable process, is afterwards dried. It is then cut into relatively short segments 15 as shown in Figs. 4 or 5 in which the cords are parallel to each other and connected by a few weak threads. For the size of blank illustrated a maximum of four such threads is sufficient. Where assembled as shown in Fig. 2, there is one cord in each segment, which is radially disposed, and because the cords are parallel it follows that each other cord is inclined at an acute angle more or less great to a radius. By properly assembling the segments in overlapped relation it will be found that although one cord in each segment is radial the cords immediately above and below it are not so that the desired angular relation of cords is preserved. Owing to the fact that the cords are only connected by a few weak threads they have the capacity of self-adjustment when subjected to pressure, thereby obviating spots or regions of non-uniform compression in the finished product.

The segments are stacked one on top of the other to form layers with overlapping ends, in other words so as to break joint, and also in such manner that the cords in one layer cross those in adjacent layers at an acute angle. This is indicated at Fig. 2 where the cords in the top layer shown in full lines are inclined to the right while the cords in the layer immediately below shown in dotted lines are inclined to the left. In this manner approximately one-half of the cords will correspond approximately to the angle of the face of the teeth on one side and the balance to the angle of the face of the teeth on the other side. This feature is indicated by the tooth 16 shown in heavy lines at left hand side of the blank. As stated, the cords are so assembled that the great majority of them have approximately the same angle of inclination as the teeth of the finished gear, it being impractical, however, in quantity manufacture, to have mathematical accuracy in this respect. The crossing of the cords in each tooth at an acute angle greatly adds to the strength and elasticity of the tooth and at the same time each cord is securely anchored along its entire length including, of course, its root or inner end. The elasticity of the teeth is a very important factor since it renders them capable of withstanding heavy and repeated shocks. After the segments are cut to the proper size they are assembled into a ring which is then subjected to sufficient heat and pressure to cause the segments to stick together, care being exercised not to permit the binder to become permanently hard. The disks, rings and hub washer are then assembled in a fixture or mold with the disks and rings interspersed as shown in Fig. 1 after which the elements are subjected to sufficient heat and pressure to consolidate the same and cause the binder to harden and retain the fibers of the disks, rings and washer, where the latter is employed, under heavy compression. After the blank is thus formed, it is permitted to cool and is machined to the exact size required and the teeth cut in the usual manner.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:—

1. A gear blank having a web comprising woven fabric made of textile material, a rim supported thereby and comprising twisted cords also made of textile material, and a binder which holds the materials in a compressed state.

2. A gear blank having a web comprising woven fabric disks made of textile material, a rim supported thereby and comprising cords also made of textile material, said cords crossing each other at acute angles in the region of the periphery in such manner as to mutually anchor the same, and a binder which retains the disks and cords in a compressed state.

3. A gear blank having a relatively thin web designed to yield axially under heavy sidewise pressure and which comprises a few disks of woven fabric made of textile material, a thickened rim which is supported by the web and comprises textile material cord arranged in layers with the cords of one layer crossing those in adjacent layers at acute angles so that the cords in the layers mutually anchor each other, certain of said disks being located between the layers of cord, and a binder which holds the fibers of the fabric and cord under compression.

4. A gear blank having a web comprising tightly woven fabric made of textile material, a rim supported thereby and comprising cords of relatively large diameter also made of textile material, said cords being assembled to form rings between which some of the fabric forming the web extends, and a binder which holds the fabric and cords in a compressed state.

5. A gear blank having a relatively thin web made of tightly woven textile material fabric, a thickened rim which except for a small portion made of said fabric is composed of short pieces of textile material cord, said cords being arranged side by side in layers with the cords in one layer crossing those in adjacent layers, and of such length that they extend from the periphery to the web, and a binder which retains the fibers of the fabric and cord in a compressed state.

6. A gear blank comprising an assemblage of tightly woven textile material and cords, the cords forming the rim portion and the woven fabric the web, a portion of said fabric also serving to connect the rim with the web, and a binder which retains the textile material and cords in a compressed state.

7. A gear blank comprising tightly woven textile material which forms the web and also supports the rim, a rim comprising rings between which a portion of the woven material extends, each ring comprising segmental elements arranged in layers and made of short, parallel pieces of cord, the cords in each segment crossing those in adjacent layers at acute angles, and a binder which retains the woven material and cords in a compressed state.

8. A gear having a web comprising a tightly woven fabric in which the threads cross each other at right angles, said web being sufficiently thin so as to yield axially when the teeth are subjected to abnormal pressure, a rim supported by the web and comprising short pieces of twisted cord, said pieces being arranged in layers with the cords in adjacent layers crossing each other at acute angles in the teeth, the inner ends of said cord being anchored to the web, and a binder which holds the cords and fabric in a compressed state.

9. A gear blank comprising a web made of textile material, a rim therefor, comprising segments made of cord in which the cords in each segment are arranged parallel to each other, one of the cords in each segment being approximately radial, said segments overlapping so that the cords in adjacent layers cross each other at acute angles, and means for retaining the web and rim portions in a compressed state.

10. A gear blank comprising an assemblage of tightly woven textile fabric and cords, the latted comprising groups of twisted yarn, which groups are in turn mutually twisted, the cords forming the rim portion and the woven fabric the web, a portion of said fabric also serving to connect the rim with the web, and a binder which retains the fibers of the fabric and cords in a highly compressed state.

11. A gear blank comprising an assemblage of woven fabric and relatively heavy cords all made of textile fibers, the fabric forming the web and the cord the rim, said cords being assembled by layers into a number of relatively thick rings of comparatively short radial depth with cords in one layer crossing those in adjacent layers at acute angles, said fabric extending between the cord formed rings and also covering the outer surfaces of the rings thereby connecting them to the web, said web being thinner than the rim and slightly elastic in an axial direction, and a binder which unites the fabric and cords into a unitary structure and holds the fibers of both in a highly compressed state.

In witness whereof I have hereunto set my hand this twenty-ninth day of October, 1925.

EMILE J. GUAY.